J. P. CAMPBELL.
IRRIGATING SYSTEM.
APPLICATION FILED MAY 25, 1914.
1,111,734.
Patented Sept. 29, 1914.
2 SHEETS—SHEET 2.
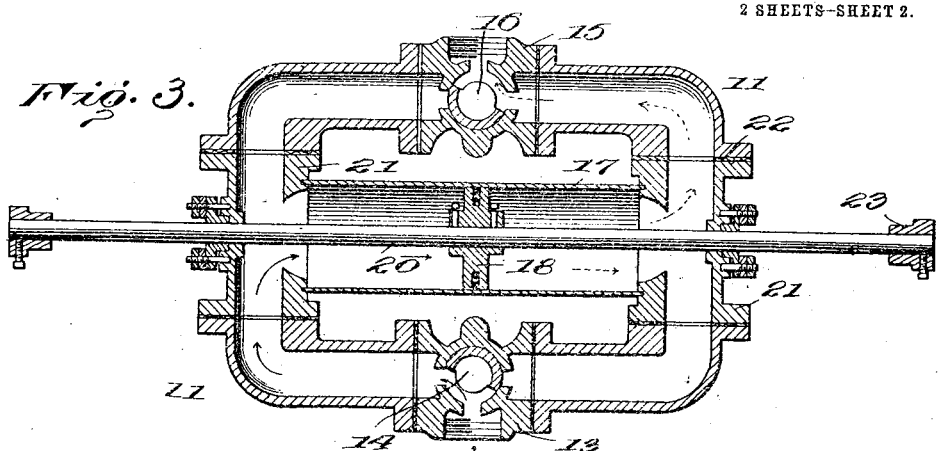
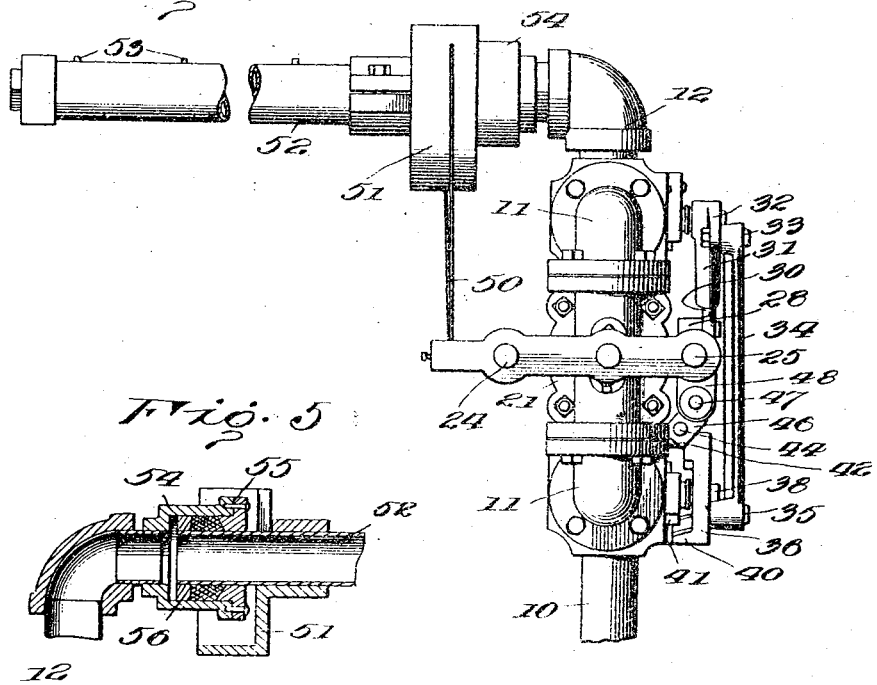
Witnesses
Inventor
J. P. Campbell
By'Attorneys

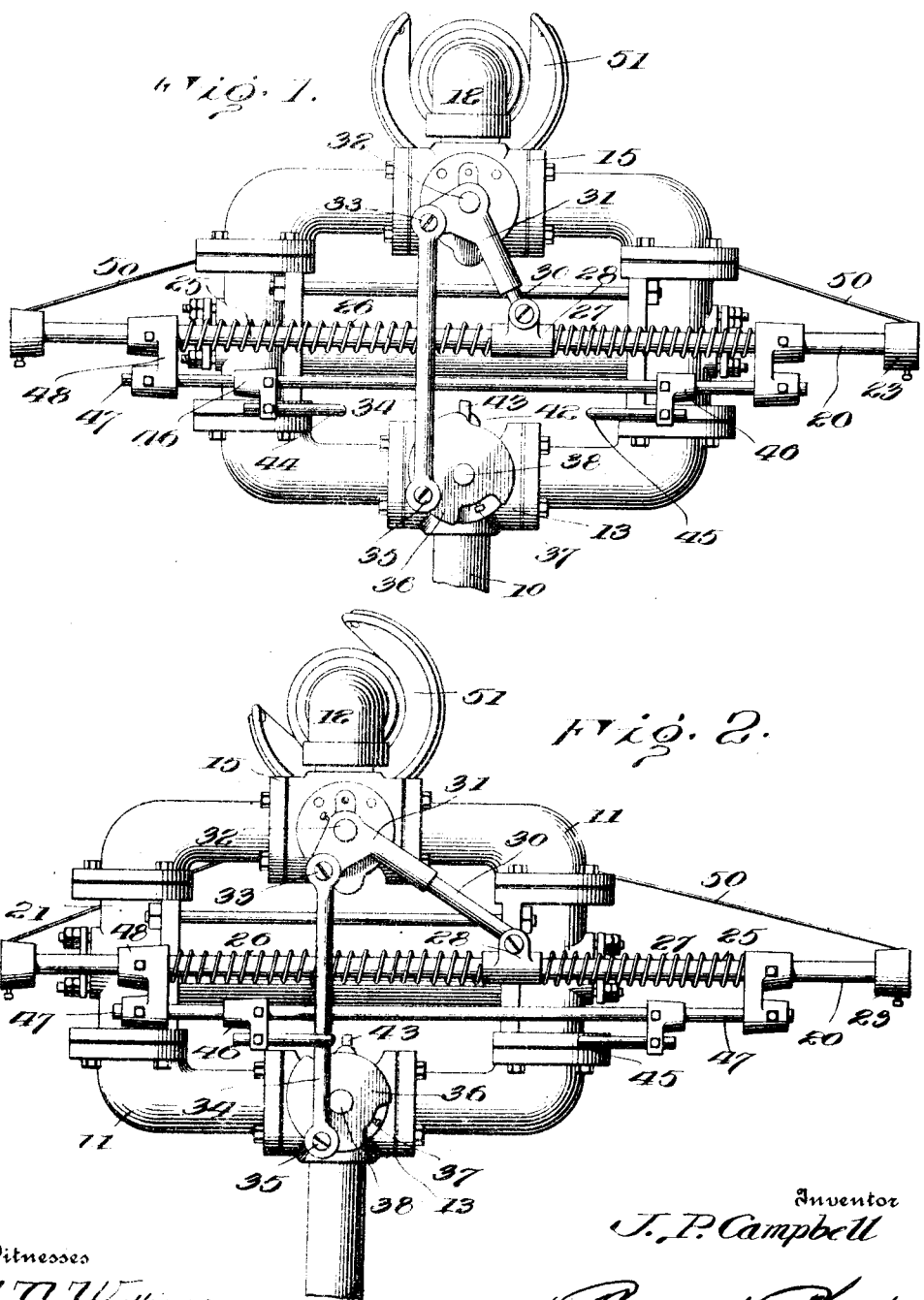

UNITED STATES PATENT OFFICE.

JOHN P. CAMPBELL, OF JACKSONVILLE, FLORIDA

IRRIGATING SYSTEM 1,111,734.    Specification of Letters Patent.    Patented Sept. 29, 1914.

Application filed May 25, 1914. Serial No. 840,845.

*To all whom it may concern:*

Be it known that I, JOHN P. CAMPBELL, a citizen of the United States, residing at Jacksonville, in the county of Duval and State of Florida, have invented certain new and useful Improvements in Irrigating Systems, of which the following is a specification.

This invention relates to irrigating systems and with regard to certain more specific features thereof to systems of a mechanical nature particularly designed for overhead irrigation.

One of the objects of the present invention is to provide a simple and practical overhead irrigating system which will be cheap to manufacture and install.

A further object is to provide a system of the above-mentioned character which will be automatic in its operation.

A further object is to provide a system for intermittently irrigating a relatively large area controlled and operated solely by the water used for irrigating.

Other objects will be in part obvious and in part hereinafter pointed out.

The invention accordingly consists in the features of construction, combination of elements and arrangement of parts which will be exemplified in the device hereinafter described, and the scope of the application of which will be indicated in the following claims.

In the accompanying drawings, wherein is illustrated one of various possible embodiments of the present invention: Figure 1 is an elevational view of the actuating mechanism in normal intermediate position; Fig. 2 is a similar view with the parts in extreme position immediately after the valves have been actuated from the position shown in Fig. 1; Fig. 3 is a longitudinal sectional view of the mechanism shown in Fig. 1; Fig. 4 is an end view of the actuating mechanism of the parts as shown in Fig. 1; Fig. 5 is a detail view of the connection between the actuating mechanism and the irrigating system proper.

Similar reference characters denote corresponding parts in the several figures.

Referring now to the accompanying drawings in detail there is denoted at 10 a main supply pipe which is adapted to be connected with a water main of any suitable source of water supply, having a considerable head of pressure. This pipe is connected at its upper end with the actuating mechanism shown in Fig. 1, which comprises a pair of oppositely extending branch pipes 11, which then extend upwardly and inwardly to connect with a common outlet 12. Adjacent the inlet is a valve chamber 13, within which is positioned a rotary valve 14. Likewise adjacent the outlet 12 is positioned a second chamber 15, provided with a similar rotary valve 16. These valves may be of any desired three-way type, so constructed as to direct the water to one side, or the other from the common inlet, for example on being revolved approximately a quarter turn. Intermediate the upper and lower horizontal pipes 11 is positioned a relatively large cylinder 17, in which is mounted a piston 18, rigidly secured to a centrally disposed piston rod 20. The intermediate connections 21 between the branch pipes or elbows 11 constitute heads. The points of connection between the cylinder heads and pipes are provided with suitable packing rings or joints 22, rendering the same water-tight.

The opposite ends of the piston rod 20 are provided with cross yokes 23, as shown more clearly in Fig. 4, and connecting these cross yokes at each side of the central cylinder 17 are guide rods 24 and 25 respectively. The guide rod 25 is provided with two spiral springs 26 and 27, separated by means of a loosely mounted cross head 28. This cross head is connected by means of telescopic members 30 and 31 with the stem 32 of the upper rotary valve 16. The member 31 is in the form of a bell crank lever, the short arm of which is pivotally connected at the point 33 with a link 34. The opposite end of such link is pivotally connected at the point 35 with a valve disk 36, secured by means of a set screw 37 to a stem 38 of the lower rotary valve 14. From this it will be seen that as the cross head 28 is moved or moves back and forth along the guide rod 26 the valves will be turned simultaneously to an equal amount to direct the water in the opposite direction. The lower valve disk 36 is provided with a rearwardly projecting lug 40, adapted to operate between certain stops 41 on the valve chamber, thereby to limit its movement to an arc equal to that necessary to efficiently operate the rotary valves. This valve disk 36 is engaged by a horizontally disposed spring-actuated stop 42, Fig. 1, carrying an upwardly projecting stud 43. This stud is adapted to be engaged by trip fingers 44 and 45, carried by suitable brackets 46 adjustably mounted upon a trip rod 47, carried by depending lugs 48 on the guide rod 25. As the fingers 44 and 45 alternately co-act with the valve lock release stud 43 the same is moved rearwardly out of contact with the valve disk 36, which permits the same to be rotated by action of the springs 26 and 27, according to which is in compressed condition at the time.

The cross yokes 23 are connected by means of cords or other suitable flexible connections 50, with the opposite sides of a winding drum 51 secured to the laterally extending irrigating pipe 52 connected with the outlet of the actuating mechanism. This backward and forward movement of the piston and cross heads or yokes 23 at its ends operates the drum to cause the drum and outlet pipe to be revolved through the upper half of the circle, thus causing the openings 53 in the outlet pipe, through which the water is forced to be turned through an arc of approximately 180°, or 90° to each side of the vertical. This free turning of the irrigating pipe is permitted by means of the automatic self-packing union or coupling shown in Fig. 5, which comprises a flange member 54 mounted upon the outlet pipe and provided with an inwardly turned stuffing box gland 55, between which and collar 56 on the irrigating pipe 52 is secured a suitable packing material. This construction it will be seen provides a water-tight connection, permitting a free turning movement.

While the operation of this device should be clear from the above description, a brief statement thereof is as follows: Assuming the parts to be in the position shown in Fig. 1, or the sectional view Fig. 3, the water under pressure enters through the supply pipe 10, and passes to the left, as indicated by the full line arrows. As the escape of this water is temporarily prevented by the position of the upper rotary valve 16 it reacts against the piston head 18 and moves the same toward the right. As this piston moves it carries with it, by means of the piston rod, the transverse end yokes 23, which in turn carry the guide rod 25 toward the right. The lower rotary valve being held in locked position will, through the intermediate connecting link 34, and bell crank lever 31, hold the cross head 28 in the position shown. This acts as an abutment for the compression of the spring 26, and allows the spring 27 to expand by reason of the movement of the right-hand yoke toward the right. After the piston has completed its limit of travel in the right-hand direction the trip finger 44 co-acts with the lock release stud 43 to permit the valve to turn to the position shown in Fig. 2. That is, the spring 26 being under compression will on release of the valve lock suddenly force the cross head 28 toward the right until the pressure of the springs at each side thereof is equalized. By means of the various adjustments this movement is sufficient to turn the valve disk 36 a predetermined amount sufficient to rotate both rotary valves, so as to close the lower valve to the passage of water to the left and prevent discharge of the water at the right through the upper rotary valve. As shown, as the valves are tripped and turned, or occupy the position shown in Fig. 2, the water then passes in from the supply pipe to the right, and moves the piston toward the left, thus forcing the water previously trapped therein out through the rotary valve 16, into the irrigating system, until the trip finger connects with the valve lock release stud to permit the valves to return to their former position. The operation is then repeated and the trapped water at the right is forced out by the movement of the piston, as indicated by the arrows in dotted lines. This oscillating movement of the piston will, as above explained, through the flexible connections 50, alternately rotate the irrigating pipe from one side to the other and intermittently sprinkle a relatively large area at each side thereof. It is of course to be understood that the supply of water may be regulated thereby to a certain degree affecting the pressure and rapidity of operation and the consequent range or irrigation.

It will thus be seen that the present device is automatic in its operation and relies on the pressure of the irrigating water for operating the actuating mechanism. There is no waste whatsoever and no external power, such as pumps or motors for oscillating the pipes, is required.

While the present device shows but a single irrigating pipe, it is of course to be understood that a plurality of pipes may be connected therewith by any suitable form of linkage whereby they oscillate in unison on the operation of a single actuating mechanism.

The device is simple and practical in its construction, having few parts which are cheap to manufacture and install, and may conveniently be replaced or re-packed when necessary, due to wear and tear. In short the invention is believed to accomplish, among others, all of the objects and advantages above set forth.

As many changes could be made in the above construction and many apparently widely different embodiments of my invention could be made, without departing from the scope thereof. I intend that all matter contained in the above description or shown in the accompanying drawings shall be interpreted as illustrative and not in a limiting sense.

Having thus described my invention what I claim as new and desire to secure by Letters Patent is:

1. In an irrigating system, in combination, an inlet pipe adapted to convey water under pressure, an irrigating pipe, and an intermediate motor having a rectilinear movement operating to rotate the irrigating pipe solely by the water in the supply pipe which subsequently passes out through said irrigating pipe.

2. In an irrigating system, in combination, a supply pipe adapted to convey water under pressure, an irrigating pipe, and intermediate mechanism for oscillating said irrigating pipe, comprising a cylinder, a piston therein adapted to be actuated solely by the water in the supply pipe which subsequently passes out through said irrigating pipe, and means connecting said cylinder with the irrigating pipe.

3. In an irrigating system, in combination, a supply pipe adapted to convey water under pressure, an irrigating pipe and intermediate mechanism for oscillating said irrigating pipe, comprising branch pipes between the inlet and outlet, three-way valves at the points of connection, and means for operating said valves in unison by the water in the supply pipe before passing to said irrigating pipe.

4. In an irrigating system, in combination, a supply pipe adapted to convey water under pressure, an irrigating pipe and intermediate mechanism for oscillating said irrigating pipe, comprising branch pipes between the inlet and outlet, three-way valves at the points of connection, and a cylinder having a piston adapted to be actuated by the pressure of water in the supply pipe for actuating said valves before passing out through said irrigating pipe.

5. In an irrigating system, in combination, a supply pipe adapted to convey water under pressure, an irrigating pipe and intermediate mechanism for oscillating said irrigating pipe, comprising a pair of branch pipes between the inlet and outlet, three-way valves at the points of connection, a double acting cylinder connected with said branch pipes, a piston in said cylinder adapted to be moved by the pressure of the water in the supply pipe acting at one side to force the water on its opposite side out into said irrigating pipe.

6. In an irrigating system, in combination, a supply pipe adapted to convey water under pressure, an irrigating pipe and intermediate mechanism for oscillating said irrigating pipe, comprising a pair of branch pipes between the inlet and outlet, three-way valves at the points of connection, a double acting cylinder connected with said branch pipes, a piston in said cylinder adapted to be moved by the pressure of the water in the supply pipe acting at one side to force the water on its opposite side out into said irrigating pipe, and means actuated by the movement of said piston for changing the relative position of said valves.

7. In an irrigating system, in combination, a supply pipe adapted to convey water under pressure, an irrigating pipe and intermediate mechanism for oscillating said irrigating pipe, comprising a pair of branch pipes from said supply pipe, and connected at their opposite ends with the irrigating pipe, three-way valves positioned at the points of connection, means connecting said valves whereby they operate in unison, a lock for said valves, and means for releasing said lock adapted to be actuated intermittently by the pressure of water in the supply pipe.

8. In an irrigating system, in combination, a supply pipe adapted to convey water under pressure, an irrigating pipe and intermediate mechanism for oscillating said irrigating pipe, comprising branch pipes connecting the supply pipe with the irrigating pipe, three-way valves at the points of connection, a double acting cylinder communicating with both of said branch pipes, a reciprocating piston in said cylinder, an external guide rod connected and movable with said piston, springs on said guide rod adapted to be alternately compressed and expanded as the piston reciprocates, and means permitting the compressed spring to suddenly expand when the piston reaches a predetermined limit of travel to rotate said valves.

9. In an irrigating system, in combination, a supply pipe adapted to convey water under pressure, an irrigating pipe and intermediate mechanism for oscillating said irrigating pipe, comprising branch pipes connecting the supply pipe with the irrigating pipe, three-way valves at the points of connection, a double acting cylinder communicating with both of said branch pipes, a reciprocating piston in said cylinder, an external guide rod connected and movable with said piston, springs on said guide rod adapted to be alternately compressed and expanded as the piston reciprocates, means permitting the compressed spring to suddenly expand when the piston reaches a predetermined limit of travel to rotate said valves, and means connecting said piston with said irrigating pipe to oscillate the irrigating pipe as the piston reciprocates.

10. In an irrigating system, in combination, a supply pipe adapted to convey water under pressure, an oscillating irrigating pipe and intermediate mechanism for said irrigating pipe, comprising branch pipes between the supply pipes and irrigating pipe, valves at the points of connection, a double acting cylinder connecting said pipes, a piston adapted to reciprocate in said cylinder, spring means associated with said piston adapted to be alternately compressed and expanded, and means actuated by the piston at a predetermined point in its travel to suddenly release the compressed spring to rotate said valves.

11. In an irrigating system, in combination, a supply pipe adapted to convey water under pressure, an irrigating pipe and intermediate mechanism for oscillating said irrigating pipe, comprising branch pipes connecting the supply pipe with the irrigating pipe, rotary valves at the points of connection, means connecting the valves whereby they operate in unison, a cylinder connecting said branch pipes, a piston therein having a piston rod, and means connecting said piston rod with the irrigating pipe for oscillating the pipe as the piston reciprocates.

12. In an irrigating system, in combination, a supply pipe adapted to convey water under pressure, an irrigating pipe and intermediate mechanism for oscillating said irrigating pipe, comprising branch pipes connecting the supply pipe with the irrigating pipe, rotary valves at the points of connection, means connecting the valves whereby they operate in unison, a cylinder connecting said branch pipes, a piston therein having a piston rod, means connecting said piston rod with the irrigating pipe for oscillating the pipe as the piston reciprocates, and means actuated by the reciprocating piston for changing the relative position of the valves, whereby pressure of the water supply is directed to act against the opposite side of said piston.

13. In an irrigating system, in combination, a supply pipe adapted to convey water under pressure, an irrigating pipe having a loose connection therewith adapted to permit relative rotation, a piston connected with said irrigating pipe adapted to rotate the latter as the piston reciprocates, and means for alternately directing the water pressure to opposite sides of said piston to force the water previously used to reciprocate the piston out into said irrigating pipe.

In testimony whereof I affix my signature in presence of two witnesses.

JOHN P. CAMPBELL.

Witnesses:
A. RHUMMEL,
A. WIGHTMAN.